United States Patent [19]
Baguley

[11] Patent Number: 5,971,269
[45] Date of Patent: Oct. 26, 1999

[54] COMPUTATIONAL TEACHING DEVICE

[76] Inventor: Bruce H. Baguley, 4150 8th SE., E. Wenatchee, Wash. 98802

[21] Appl. No.: 08/815,415

[22] Filed: Mar. 11, 1997

Related U.S. Application Data

[60] Provisional application No. 60/013,178, Mar. 12, 1996.
[51] Int. Cl.⁶ .............................. G06C 27/00; G06C 7/10; G09B 1/00
[52] U.S. Cl. .............................. 235/68; 235/136; 434/205
[58] Field of Search ...................... 235/136, 68; 434/188, 434/191, 205

[56] References Cited

U.S. PATENT DOCUMENTS

| | | | |
|---|---|---|---|
| 2,875,529 | 3/1959 | Cornelius | 35/32 |
| 3,400,472 | 9/1968 | Strnad . | |
| 3,455,033 | 7/1969 | Han . | |
| 3,643,347 | 2/1972 | Ziering | 35/30 |
| 3,655,191 | 4/1972 | Grant . | |
| 3,690,018 | 9/1972 | Arroyo | 35/31 |
| 3,864,850 | 2/1975 | Welmecke | 35/31 |
| 3,872,610 | 3/1975 | Dumovich | 35/30 |
| 3,908,287 | 9/1975 | Darnell | 35/31 |
| 4,006,344 | 2/1977 | Schutte | 235/68 |
| 4,218,609 | 8/1980 | Chin . | |
| 4,553,944 | 11/1985 | Flanagan | 434/191 |
| 4,772,240 | 9/1988 | Boskovic | 446/170 |
| 4,979,748 | 12/1990 | Danielak et al. . | |
| 5,040,987 | 8/1991 | Frazier | 434/188 |
| 5,169,317 | 12/1992 | Hollander | 434/208 |
| 5,332,216 | 7/1994 | Whipple . | |

*Primary Examiner*—Donald Hajec
*Assistant Examiner*—Daniel Sherr
*Attorney, Agent, or Firm*—Kolisch Hartwell Dickinson McCormack & Heuser

[57] ABSTRACT

A teaching device comprising a group of balls, a first counter, a second counter and a tray interconnecting the first counter to the second. The first counter represents the problem to be solved, and the second counter indicates the solution to the problem. Both counters include several parallel columns for holding several of the balls in a line, and a stop for at least one of the columns to limit the number of balls that can be held by that column. The tray is placed below the first counter so that balls placed in the first counter may be dumped into the tray by removing the stops from the columns of the first counter, and then pushed or allowed to fall from the tray into the second counter.

32 Claims, 7 Drawing Sheets

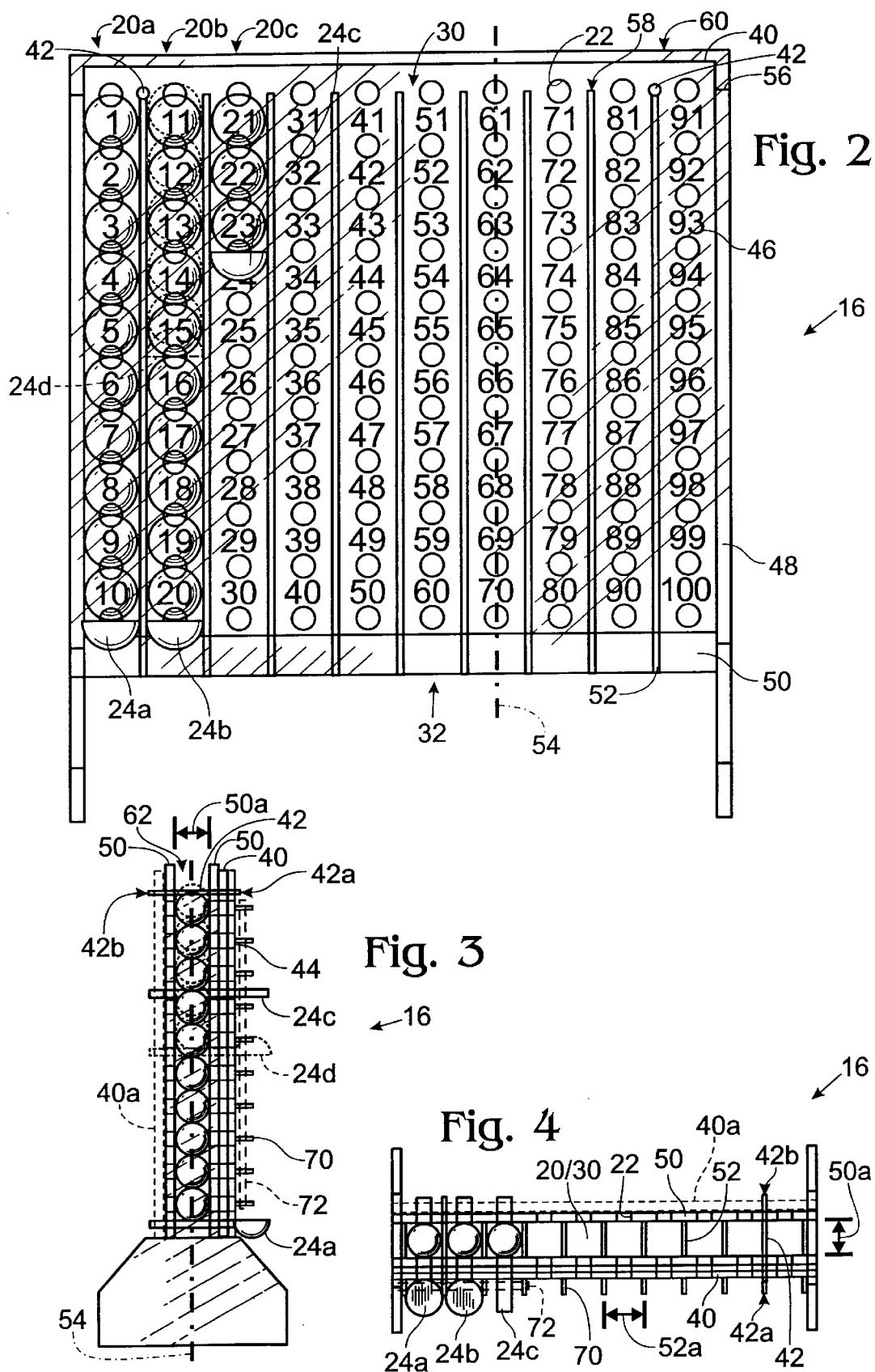

COMPUTATIONAL TEACHING DEVICE

CROSS REFERENCE TO RELATED APPLICATIONS

This application springs from, is based upon, and claims the benefit under 35 U.S.C. § 119 of prior-filed U.S. Provisional Patent Application Ser. No. 60/013,178, entitled COMPUTATIONAL TEACHING DEVICE, filed on Mar. 12, 1996, incorporated herein by reference.

TECHNICAL FIELD

This invention relates generally to the visual, tactile, and/or aural presentation of mathematical problem solving through the use of marbles, balls or the like, and is useful for both the teaching and learning of mathematical problems such as counting, addition, subtraction, multiplication, or division. It also is useful for demonstrating and understanding math-related concepts like patterns, fractions, different number bases, graphing, statistics, and negative numbers.

BACKGROUND ART

Teaching devices for use in teaching and learning basic mathematics are known, and include devices using marbles to represent numbers. For example, U.S. Pat. Nos. 2,875,529 and 3,400,472, incorporated herein by reference, disclose marble-based teaching devices with relatively limited capabilities. The teaching device disclosed in the '472 patent is designed only for use in teaching addition. The device in the '529 patent is described for use in teaching addition, subtraction, multiplication, and division. However, the '529 device is relatively constrained in its application, and limits the tactile and aural involvement of the student in the learning process. More specifically, the flow of marbles in the '529 device is caused by the gentle tilting of the device, and the marbles are retained in partially enclosed channels. The gentle slope limits the impact-generated noise as the marbles move from one position to the next. The enclosed channels limit the ability of the student or teacher to touch or otherwise interact with the marbles.

Accordingly, there is a need for a computational teaching device that can be used to teach and learn counting and all four of the basic mathematical operations, and that will provide the opportunity for significant student involvement in the problem-solving process. There also is a need for a device that easily will demonstrate the connections between basic mathematical problems and patterns, fractions, different number bases, graphing, statistics, and negative numbers.

DISCLOSURE OF THE INVENTION

The preferred embodiment of the present invention includes a group of hollow plastic balls placed in an input counter to represent the problem to be solved, and then moved into an output counter to indicate the solution to the problem. The counter may be used to teach counting, with the balls serving as unit indicators. Instead of balls, any convenient item may be used as unit indicators, provided the item is easy to handle and move from one counter to the next. An elevated tray is provided so that the balls may be dumped into the tray and then pushed or allowed to fall from the tray into the selected counter. This makes loading of the counter much easier and faster than placing the balls one-at-a-time into the counter, and it allows a single counter to be used as both the input and output counter.

When used to solve certain mathematical problems, a first counter may be used as the input to the problem and a second counter may be used as the output to the problem. The tray is used to form a connector between the first counter and the second counter. The first counter is placed in the tray so that the balls fall into the tray when they are released from the counter. The second counter is placed at the outlet of the tray so that the balls from the first counter are funneled to the second counter by the tray. In addition, the tray allows the input counter to be used as the output counter as well.

The counters have various cavities that sort the group of balls into patterns having a user-definable geometry. For example, the cavities may be in the form of columns that hold the balls in a vertical stack, with the balls in a single line. For most applications, each column is tall enough to hold up to 10 balls. Thus, the number 30 may be represented by sorting the balls into three columns of ten. Different height columns could be used for problem solving in other base systems. Columns 8 balls high would be used for base eight problem solving. This could also be accomplished by limiting the depth of the columns that is used. Alternatively, a larger counter with higher columns, such as 16 balls high, could be used for higher based counting, such as base sixteen.

The volume of each of the cavities can be user-defined or adjusted to hold only a certain number of balls. In the column example discussed above, the maximum volume of a column is also the height of the column, and volume may be adjusted by adjusting the amount of that height that is usable. The preferred way of making this adjustment is by forming holes along the height of the column, and inserting a peg into one of those holes so that the peg extends through the column, thereby limiting the usable depth. The holes may be placed one ball's width apart so that the column may be set to hold the desired number of balls. The pegs may be used separately, or mounted in a carrier to keep the pegs aligned. The carrier might be particularly useful for setting all of the columns to the same depth.

More or less of the group of balls may be used, depending on the problem to be solved. Preferably, each ball is handled by the student as it is inserted into the first counter, or moved from one counter to the next. While use of the tray to feed a counter or connect one counter to the next reduces the amount of handling of each ball, it still allows some hands-on interaction as the balls are forced from the tray and it assures the student that the number of balls is fixed during the operation. No balls escape from the system or are introduced accidentally.

The entire process is controlled easily by hand, allowing the student to experience mathematical problem-solving by touch, and providing tactile feedback to the student. The sound of the impact of the balls with either the peg or other balls reinforces the counting process by providing aural feedback to the student. Similarly, when the pegs are removed and the balls drop out of the counter, the resulting noise is louder or quieter, depending on the number of balls falling out of each column.

This process is reinforced further as the balls are fed into the second counter, where the balls will drop into the cavities creating yet more noise. The overall volume of the noise can be controlled by carefully selecting the material used for the balls. Solid metal balls or glass marbles will make much more noise than the preferred hollow plastic balls. It has been found that the sound produced helps to retain the student's interest.

The counter or counters preferably are made out of clear plastic, and the balls move dramatically from one level to the next. Furthermore, the balls move into and out of recognizable patterns, and preferably move from a vertical plane into a horizontal plane and back again. The movement and patterns provide visual feedback as the balls move into and out of the counters, reinforcing further the tactile and aural feedback discussed above.

Labeled panes may be operatively attached to each counter to represent the problem being solved or the answer to the problem. Patterns of numbers represent the problem or the answer, and thus help a student to understand the use of the computational teaching device for each type of problem. The patterns may cover only a selected portion of a pane, to demonstrate use of the same counter for various problems that use less that all of the available columns or height of columns, such as solving problems in base 8 on a counter that is ten unit indicators high.

Multiple panes may be placed on a single counter, and are preferably clear. This allows the interrelationship between various problems or concepts to be demonstrated in an additive process, in which each pane added is labeled to show an additional aspect of the problem. It also allows a student to compare the patterns of various problems, and identify similarities and differences in the patterns used in connection with those problems.

The panes may also be constructed with various physical features that aid the student in learning mathematics. For example, the panes may regulate use of the counter. Portions of a pane may be solid or otherwise patterned to prevent pegs from being inserted into selected portions of the counter, preventing use of those portions of the counter.

Alternatively, the panes may help a student track the patterns used in various problems. One or more panes may have posts that stick out from the pane far enough that a rubber band may be stretched over the posts to trace a pattern. The traced pattern may then be compared to unit indicator patterns in the counter, or compared to labeling patterns on other panes.

An alternative embodiment of the invention is in the form of a graphical display of a computer or other visual and audio output device. The graphical display simulates the placement of balls into a first counter and the movement from that counter to a second counter to indicate visually the solution to the problem.

BRIEF DESCRIPTION OF THE DRAWINGS

FIG. 2 is a front plan view of a slightly alternative embodiment of one of the counters shown in FIG. 1, shown on a slightly larger scale than in FIG. 1, and shown being used as an input counter to solve the problem twenty-three minus fifteen.

FIG. 3 is a side elevation of the counter shown in FIG. 2, shown on a reduced scale compared to FIG. 2, with a labeled pane and a post pane shown hanging from the counter.

FIG. 4 is a top plan view of the counter shown in FIG. 3.

DETAILED DESCRIPTION OF THE PREFERRED EMBODIMENT

Figure 1:
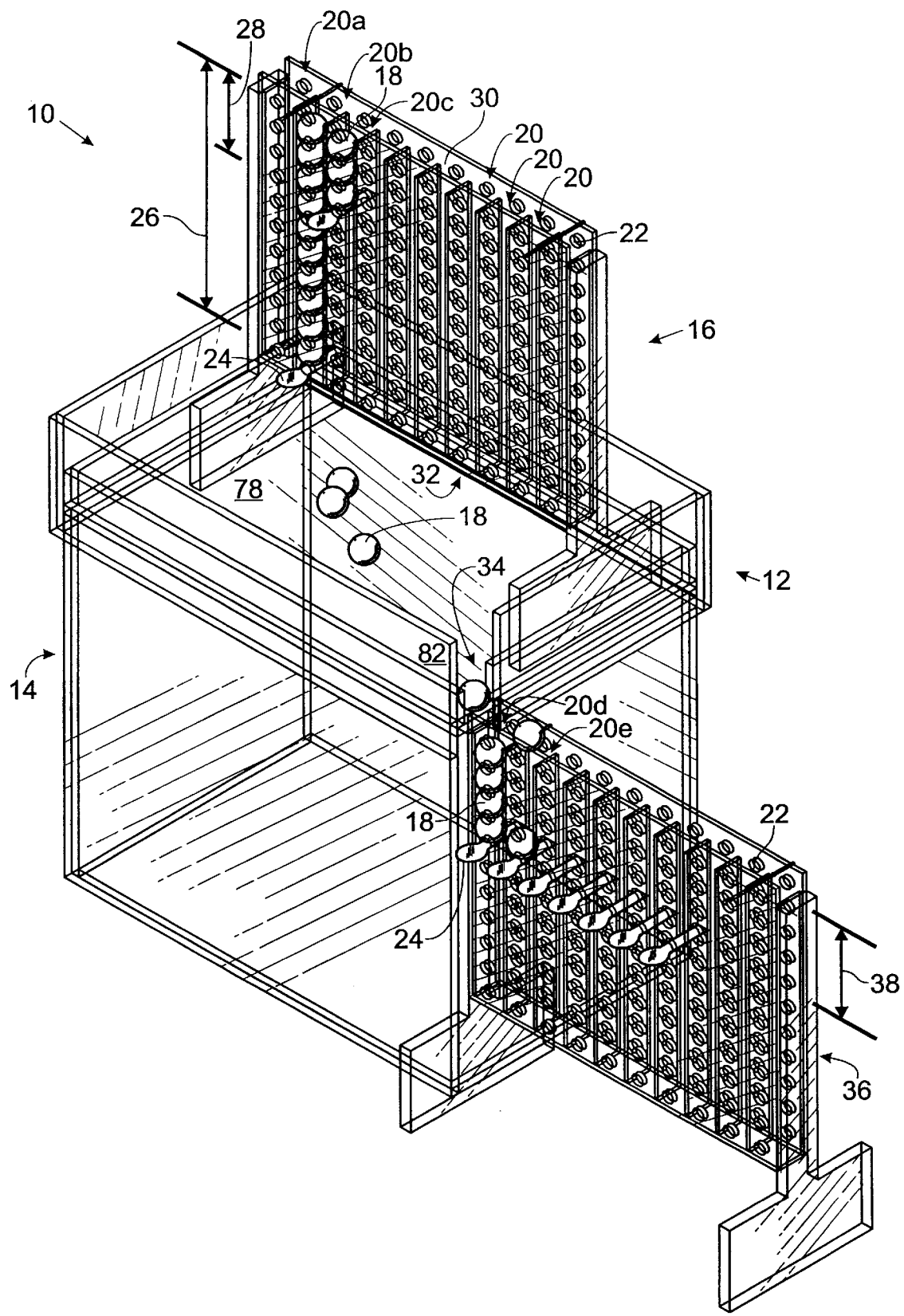
FIG. 1 is an isometric view of the teaching device according to the present invention, taken from the upper, front, right, corner, shown being used to solve the problem twenty-three divided by four.

The preferred embodiment of the device of the present invention is shown in FIG. 1, indicated generally at 10. Device 10 preferably includes an elevated tray 12, placed on a pedestal or box 14. Tray 12 supports an input counter 16 holding a plurality of balls 18, and is sized relative to counter 16 so that balls 18 may be moved simultaneously from counter 16 to tray 12. Ball 18 is just one example of what is referred to in the claims more broadly as a unit indicator, to describe any item that is easy to handle and move. Balls 18 preferably are of a fixed size so that consistent results may be obtained when using device 10, as described below.

Input counter 16 includes a plurality of indicator-receiving input cavities in the form of parallel columns 20, each with a series of evenly spaced holes 22 formed so that one or more movable pegs 24 may be inserted into holes 22 as a movable stop to define a fixed depth for each column 20, such as indicated by first dimension 26 and second dimension 28. Defining a fixed depth sets a maximum unit indicator volume for one or more of columns 20, thereby establishing a set quantity of balls 18 that can be received by those columns.

Balls 18 may be placed in selected columns 20, through an open top 30, as shown for second and third columns 20b and 20c in input counter 16, with second column 20b holding ten balls 18 and third column 20c holding three balls 18. Pegs 24 then may be removed from selected columns 20 to dump or release balls 18 from the column, through an open bottom 32 and into tray 12. In FIG. 1, ten balls 18 have been released from first column 20a, with four of those released balls shown resting in elevated tray 12.

Still referring to FIG. 1, elevated tray 12 includes an outlet 34 through which balls 18 may be push-fed, with one ball 18 shown adjacent outlet 34. An output counter 36 having a construction similar to input counter 16 is shown aligned with outlet 34, disposed beneath input counter 16. Tray 12 forms a connector between input counter 16 and output counter 36, receiving balls 18 from input counter 16, and directing balls 18 into output counter 36. In operation, balls 18 cascade from counter 16, into tray 12, and then into output counter 36. This is why device 10 is described as a cascaded computational teaching device.

Since input counter 16 is constructed similarly to output counter 36 in each of the specific embodiments of device 10 described herein, the reference below to "counter 16" is to a generic counter, irrespective of its position relative to connector 12, while the reference to "input counter 16" or "output counter 36" is to a counter placed in the input or output position relative to connector 12, respectively.

Focusing on output counter 36 in FIG. 1, pegs 24 are shown inserted into holes 22 to define a third dimension 38 for columns 20 that is approximately four balls deep. Six balls 18 are shown having been fed out of elevated tray 12 and into output counter 36, with four of the balls filling first column 20d, one of the balls just entering second column 20e, and one of the balls resting in second column 20e. As additional balls 18 are fed from elevated tray 12, successive columns 20 may be filled. If needed, a finger may be placed in the unfilled columns to ensure that the columns are filled sequentially. Once all of balls 18 have been released from input counter 16 and fed into output counter 36, an answer to a mathematical problem may be produced through such sequential feeding.

In FIG. 1, the problem being solved is the division of the number twenty-three by four. The number twenty-three is represented in input counter 16 by filling the first two columns with ten balls 18 and the third column with three balls 18. Division of the number twenty-three by the number four is accomplished by output counter 36. Pegs 24 are placed at third dimension 38 and then columns 20 of output counter 36 are filled sequentially with four balls 18 each, controlled by third dimension 38. In the solution (not shown) five columns 20 of output counter 36 will hold four balls 18, and the sixth column 20 will hold three balls. Thus, the answer is five, remainder three.

Turning now to FIG. 2, input counter 16 is shown as it would be used for subtraction. The problem to be solved is twenty-three minus fifteen. First, twenty-three balls 18 are placed in counter 16, as shown. Pegs 24a and 24b are placed at the bottom of first two columns 20a and 20b to allow ten balls to fill first two columns 20a and 20b, and peg 24c is placed in the fourth hole of third column 20c, to allow three balls to fill third column 20c. Next, an additional peg 24d, shown in dashed lines, is inserted into the sixth hole of second column 20b, so that five balls 18 will remain below additional peg 24d.

Additional peg 24d causes five balls 18 to rise slightly, as shown in dashed lines. From this arrangement of balls 18 in counter 16, two methods are available to obtain the answer. First, pegs 24a and 24b may be removed from first and second columns 20a and 20b, allowing fifteen balls 18 to drop from counter 16. The answer then is found by counting the number of balls 18 that remain in counter 16. Alternatively, pegs 24b and 24c in the second and third columns may be removed, allowing balls 18 to drop from counter 16, and leaving fifteen balls 18 remaining in counter 16. The answer then is found by feeding the dropped balls 18 into an output counter, as discussed above with respect to FIG. 1.

Subtraction of the number fifteen perhaps is a unique example, because peg 24d is placed in the middle of second column 20b, so that five balls 18 are above and five balls 18 are below peg 24d. If other numbers are being subtracted, for example the number thirteen, peg 24d must be placed either in the fourth or eighth hole, depending on the method to be used to solve the problem, so that there are either three balls above or three balls below peg 24d. The solution is found by counting the number of balls 18 released from counter 16, or the number of balls 18 remaining in counter 16, respectively.

While still discussing FIG. 2, it is important to note that pegs 24a, 24b, and 24c are inserted in a first position in which the body of the peg fills the lower one-half of the selected hole 22. In this position, balls 18 are located within columns 20 so that the intersection between two balls 18 corresponds to the middle of one of holes 22. When a second peg 24 is to be inserted into a column, such as peg 24d, it must be inserted in an inverted position, as shown. Otherwise, the additional peg would interfere and bind with balls 18.

Counter 16 is shown in FIG. 2 with a removable labeled flat pane 40 operatively attached to counter 16, preferably hanging from a pair of pins 42. Pins 42 are seen more clearly in FIGS. 3 and 4, and extend in both directions from counter 16, as identified by ends 42a and 42b, exposed for receiving pane 40 by sliding pane 40 onto pin 42. FIGS. 3 and 4 also show that more than one pane may be placed on counter 16 at a time, as indicated in dashed lines at 40a and solid lines at 44. Pane 44 is a special design of pane, described in more detail below. Returning attention to FIG. 2, pane 40 may be marked with labels 46, to indicate visually the input to the problem being solved, for use on input counter 16, or the solution to the mathematical problem, for use in output counter 36.

In FIG. 2, holes 22 and pegs 24 are shown with a circular and semi-circular configuration, respectively. It will be apparent that other geometrical shapes could be used, such as squares or rectangles, with the cross section of pegs 24 being approximately one-half or less of the cross section of hole 22. In FIGS. 3 and 4, it will be noted that peg 24c is slightly different in configuration from pegs 24a and 24b. This "headless" version of peg 24 is easier to manufacture, and does not interfere with the placement or removal of panes on counter 16, even if peg 24c is holding balls 18 in counter 16 while the pane is placed or removed. It also allows peg 24c to be inserted from one side of counter 16, and removed from the other, which is particularly useful when several students are working as a team with a single counter.

While still discussing FIGS. 2–4, the details of counter 16 may be addressed. For example, counter 16 is formed generally from legs 48 and walls 50. Walls 50 are spaced at a distance 50a approximately equal to the diameter of ball 18, as seen in FIGS. 3 and 4. Dividers 52 are fixed between walls 50 to define columns 20, again spaced at a distance 52a approximately equal to the diameter of ball 18. Preferably, walls 50 are planar and parallel, as are dividers 52, resulting in parallel columns each having a longitudinal axis, one of which is indicated in FIGS. 2 and 3 at 54. The various longitudinal axes of columns 20 therefore preferably are coplanar (with the plane of axes 54 extending out of the page in FIG. 3) and approximately vertical.

As seen best in FIG. 2, legs 48 each have a top 56 and dividers 52 each have a top 58. Tops 56 and 58 are fixed at substantially the same height. Walls 50 also have a top, indicated at 60, which preferably extends above the height of tops 56 and 58. This construction results in a ball-retaining trough 62, seen best in FIG. 3, interconnecting columns 20. Legs 48, walls 50, and dividers 52 also define open tops or openings 30 for columns 20, discussed earlier. Walls 50 extend above openings 30 so that openings 30 are between walls 50 of trough 62. Balls 18 may be pushed in single file through trough 62 and allowed to fall into unfilled columns 20, with trough 62 operatively connecting and sequentially aligning openings 30 with outlet 34 of tray 12 so that balls 18 exiting from tray 12 can be directed into columns 20 in sequence.

Walls 50 are shown in FIGS. 2–4 overlapping legs 48. It will be noted that this construction differs slightly from an alternative construction shown in FIG. 1, in which the legs overlap the walls. The construction shown in FIG. 2 is believed stronger than that of FIG. 1.

Figure 5:
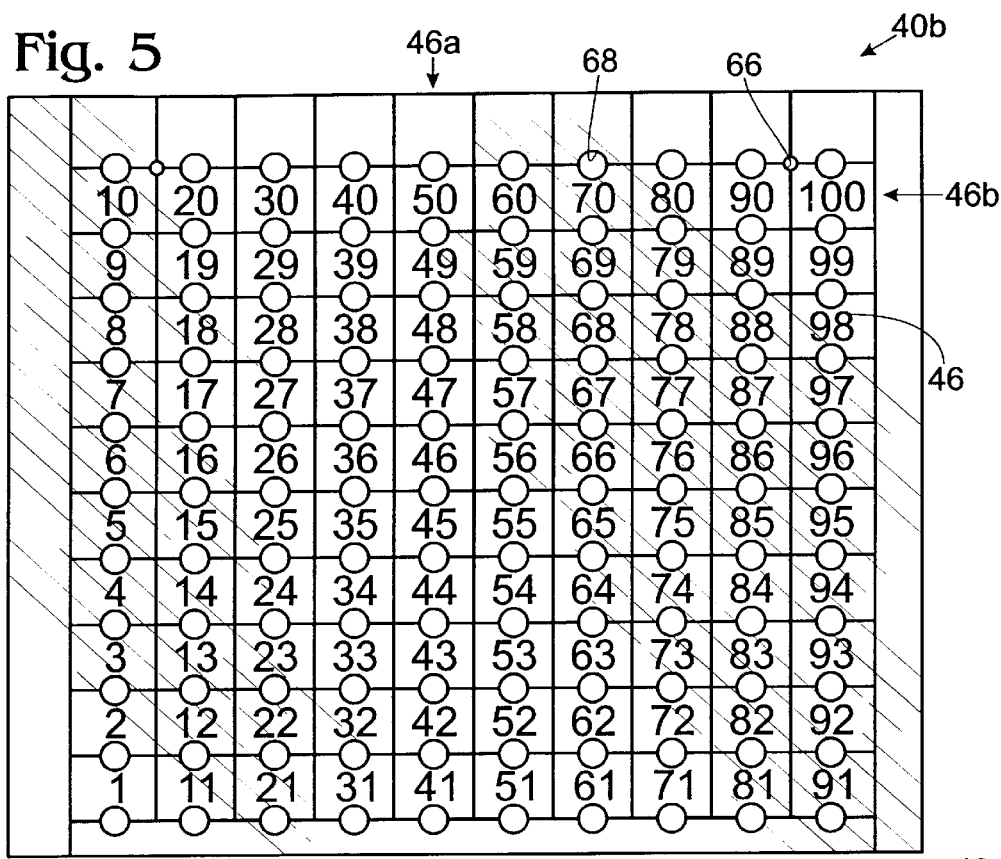
FIG. 5 is a front elevation of an alternative labeled pane, shown on about the same scale as FIG. 2, used for counting.

Turning to FIG. 5, another embodiment of a pane 40*b* is shown, labeled for use in counting. Labels 46 are placed on pane 40*b* to make it easier for a user of counter 16 to keep track of the number of balls 18 held within counter 16, and thereby to indicate visually the purpose of one or more of columns 20 for a particular type of mathematical problem. Labels 46 may be arranged in columns 46*a* or rows 46*b*, or both, as shown in FIG. 5. The particular labeling shown in FIG. 5 is found to be useful for counting operations, and is best used in the input counter portion of the problem shown in FIG. 1, and both the input and output counters for the problems shown in FIG. 2.

Pin holes 66 are used to place pane 40*b* on pins 42 of counter 16, and peg holes 68 allow pegs 24 (not shown in FIG. 5) to pass through pane 40*b*. In use, the bottom set of peg holes, identified at 68*a*, each hold one peg 24. As balls 18 (not shown in FIG. 5) are fed sequentially into a counter 16 to which pane 40*b* is attached, the total number of balls will be indicated by the number superimposed over the last ball in the counter.

Figure 6:
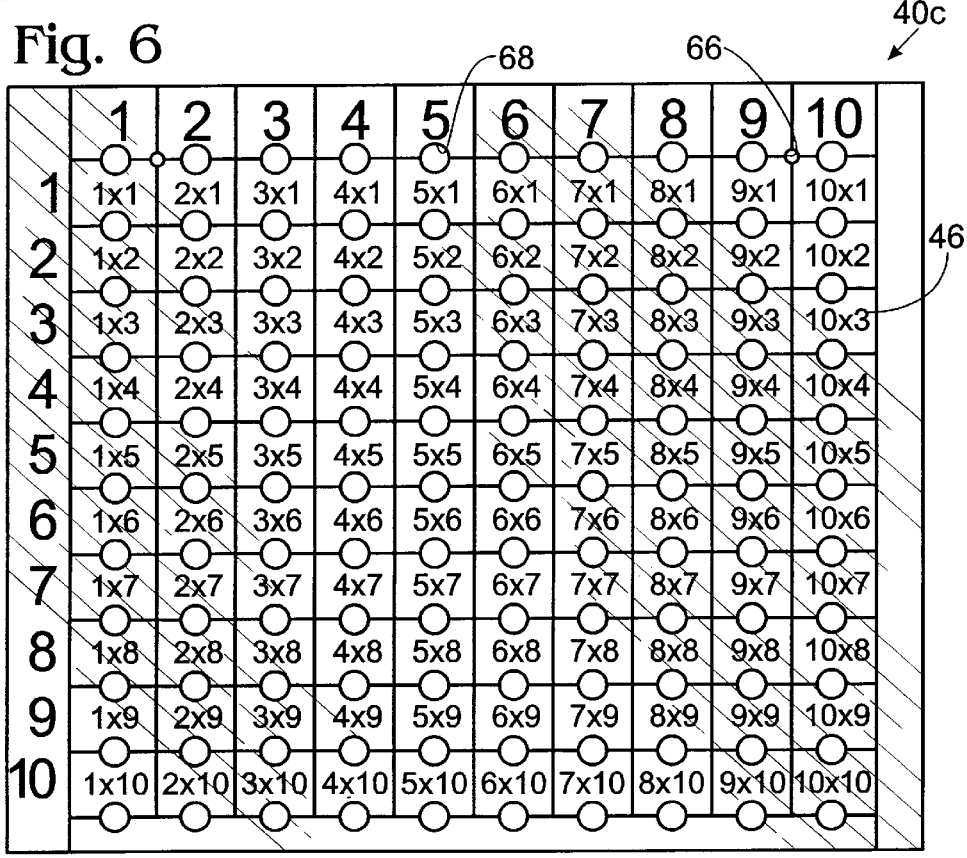
FIG. 6 is a front elevation of another alternative labeled pane, shown on about the same scale as FIG. 2, used for division.

Another embodiment of a flat pane 40*c* is shown in FIG. 6, labeled for use as the input for multiplication and the output for division. Pegs 24 (not shown in FIG. 6) may be placed through peg holes 68 at the designated multiplier or divisor. Balls 18 (not shown in FIG. 6) may be fed sequentially into a counter 16 (not shown in FIG. 6) to which pane 40*c* is attached. If the problem to be solved is multiplication, a specific number of columns 20 are filled. If the problem to be solved is division, columns 20 are filled until no more balls 18 remain to be fed into counter 16. For multiplication, the answer is found by releasing balls 18 from counter 16, and then feeding balls 18 into a counter 16 to which pane 40*b* may be attached. For division, the answer is found by counting the number of filled columns 20. The number of balls 18 remaining in an unfilled column, if any, is the remainder.

Numerous other variations of labeled pane 40 are possible as well, some of which are shown below in table format. In the tables, the letter "x" designates a portion of the pane that need not be labeled and need not include a peg hole. In Table 1, a counting pane is shown that may be used for counting in base 8.

TABLE 1

Counting pane for base 8

| X | x | x | x | x | x | x | x | x | x |
|---|---|---|---|---|---|---|---|---|---|
| 10 | 20 | 30 | 40 | 50 | 60 | 70 | 100 | x | x |
| 7 | 17 | 27 | 37 | 47 | 57 | 67 | 77 | x | x |
| 6 | 16 | 26 | 36 | 46 | 56 | 66 | 76 | x | x |
| 5 | 15 | 25 | 35 | 45 | 55 | 65 | 75 | x | x |
| 4 | 14 | 24 | 34 | 44 | 54 | 64 | 74 | x | x |
| 3 | 13 | 23 | 33 | 43 | 53 | 63 | 73 | x | x |
| 2 | 12 | 22 | 32 | 42 | 52 | 62 | 72 | x | x |
| 1 | 11 | 21 | 31 | 41 | 51 | 61 | 71 | x | x |
| x | x | x | x | x | x | x | x | x | x |
| x | x | x | x | x | x | x | x | x | x |

Figure 7:
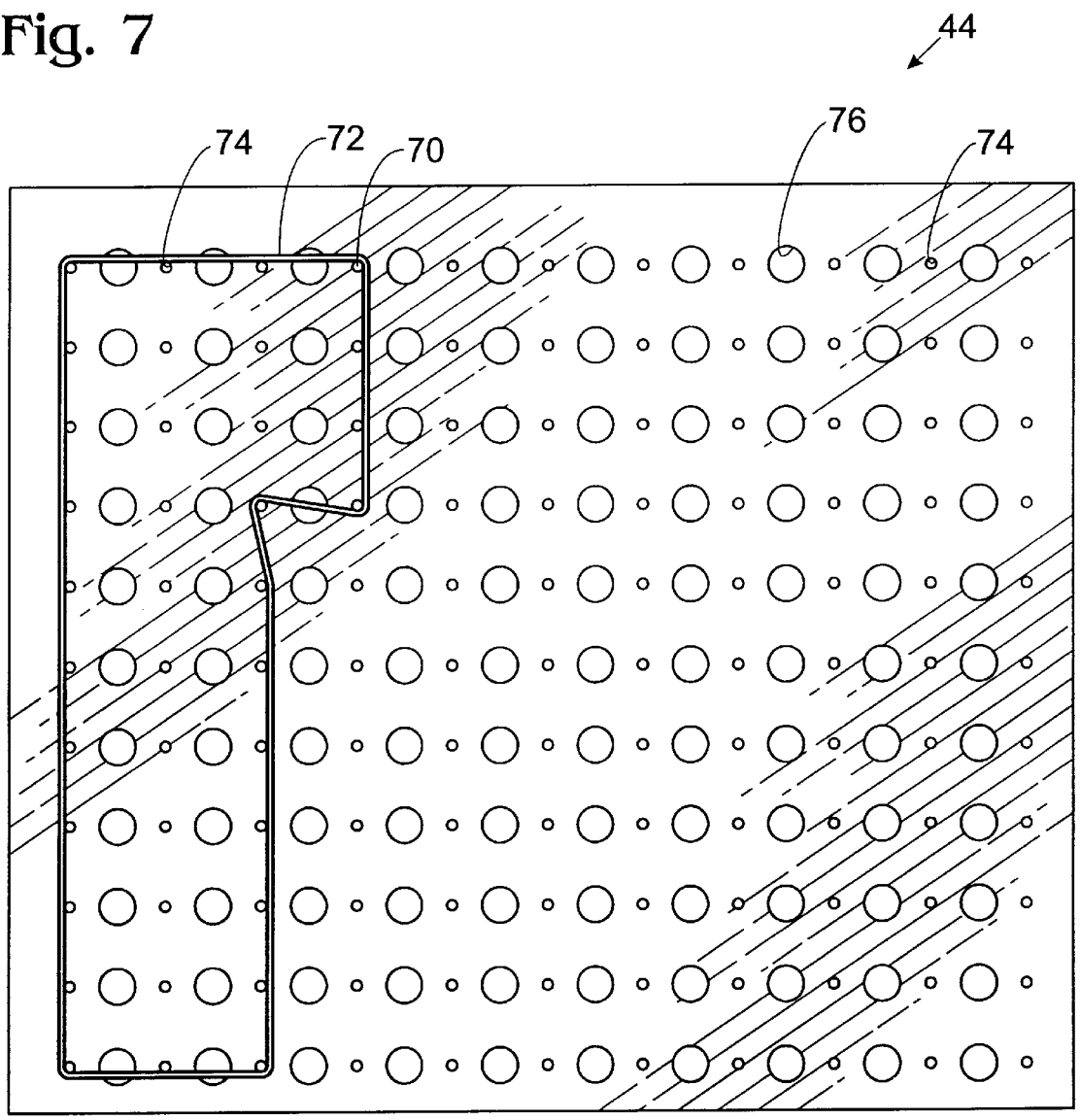
FIG. 7 is a front elevation of a post pane, shown on a slightly larger scale than the panes in FIGS. 5 and 6, and shown with a rubber band stretched about the posts to trace the pattern of the number twenty-three, corresponding to the pattern of balls shown in FIG. 2.

Viewing FIG. 7 in connection with FIGS. 3 and 4, pane 44 is what is referred to as a post pane, having multiple posts 70 over which a rubber band or string 72 may be stretched to trace patterns. For example, post pane 44 may be used in connection with the subtraction problem shown in FIG. 2, so that the user has a visual reminder of the input to the problem (i.e. the number twenty-three), even after the selected balls 18 have been released from the counter. Post pane 44 includes pin holes 74 so that it may be attached to a counter, as shown in FIGS. 3 and 4. Post pane 44 also includes peg holes 76, similar to peg holes 68 of pane 40. If desired, two or more such post panes 44 may be used in connection with device 10, so that the inputs or solutions to various problems may be recorded and superimposed over various counters to compare different problems and solutions.

Figure 8:
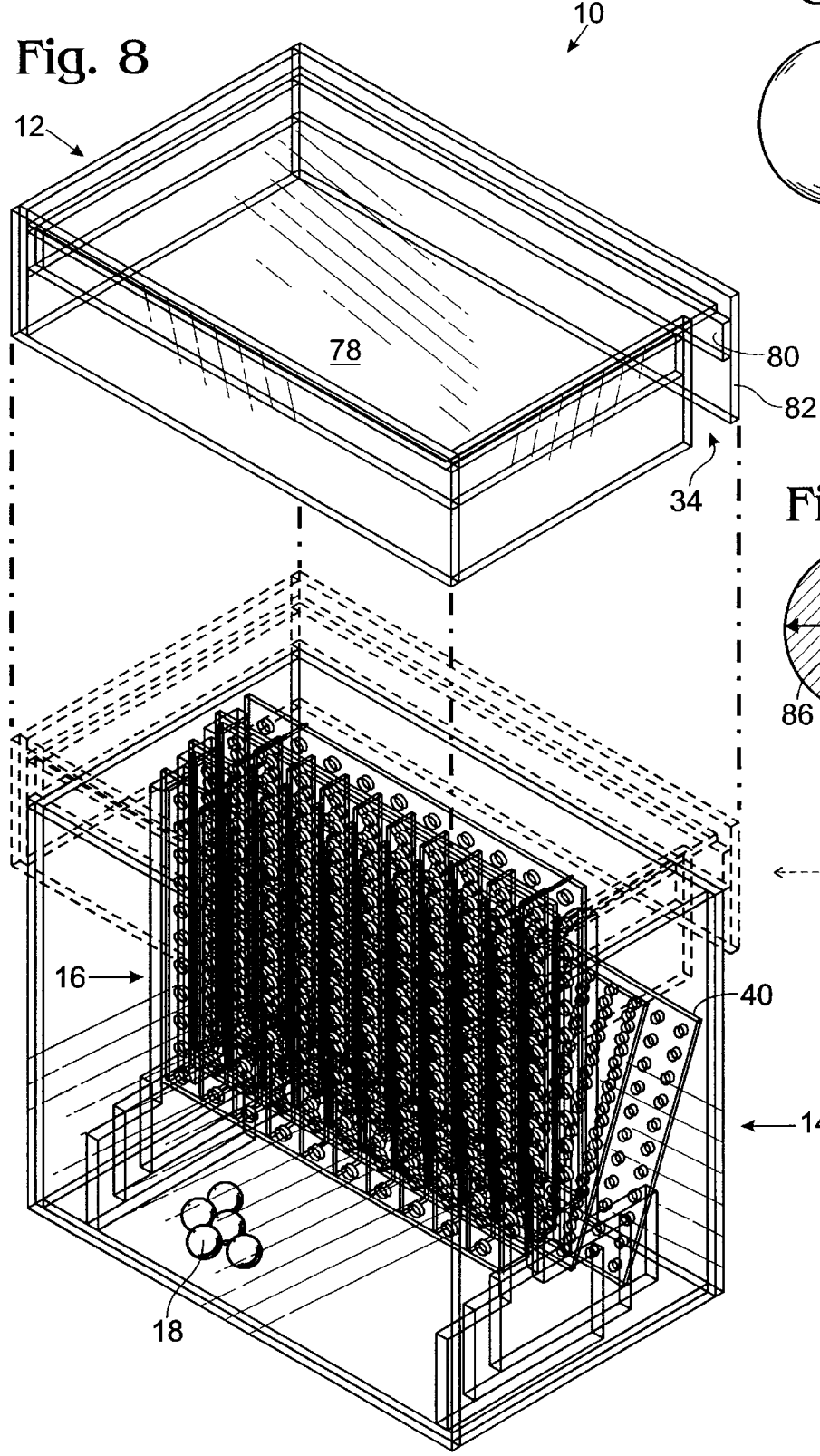
FIG. 8 is an isometric view of the device shown in FIG. 1, with three counters stored inside the carrying case, and a few panes and balls shown by way of representation of the various components that may be stored in the carrying case, and with the lid shown removed from the carrying case in solid lines, and in its closed position on the carrying case in dashed lines.

Turning now to FIG. 8, device 10 is shown in a storage position, with the various components stored in box 14. Preferably, box 14 is hollow and of a size sufficient for storing one or more counters 16, with three such counters 16 shown placed inside box 14 in a stored position. In addition, balls 18 and panes 40 and 44 may be stored, as shown. Counters 16 are shown stored in an upright, vertical position. Alternatively, counters 16 may be stored in a flat, horizontal position, with spacers and filler boards (not shown) being used to create a level false bottom (not shown) above counters 16 and within box 14, so that other items may be stored on top of counters 16.

An additional aspect of elevated tray 12 is represented in FIG. 8, with elevated tray 12 being shown positioned as a lid for box 14. Elevated tray 12 is formed with a floor 78 and a ledge 80, both of which are surrounded by an outer wall 82. Because of the reversibility of tray/lid 12, it may be described as a lid that serves as a tray or connector when inverted, as opposed to a tray that serves as a lid. When viewed as a lid, as shown in FIG. 8, lid 12 is formed with walls 82 that extend downwardly to conform to box 14 so that lid 12 may be held on box 14 and thereby enclose box 14. When viewed as a tray, in an inverted position as shown in FIG. 1, walls 82 extend upwardly from box 14 to define outer limits of a connector for receiving balls 18 from counter 16.

Ledge 80 and wall 82 are shown completely severed to form outlet 34. Alternatively, a hole, not shown, may be formed so that ledge 80 and wall 82 maintain some structural integrity.

Ledge 80 provides clearance between floor 78 and counters 16 held within box 14. This clearance is necessary if floor 78 is to align properly with trough 62 when box 14 is used as a pedestal for elevating and supporting tray 12, as shown in FIG. 1, because top 60 of counters 16 must fit below floor 78 when counters 16 are stored vertically in box 14, as shown in FIG. 8, while top 60 should be above floor 78 when counter 16 is in its operating position 30, shown in FIG. 1. Ledge 80 is not needed if box 14 is sized to hold counters 16 in their flat, horizontal storage position.

Figure 9:
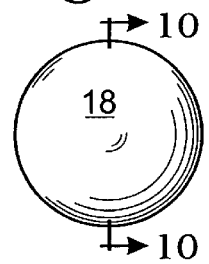
FIG. 9 is a front elevation of the ball, shown on a greatly enlarged scale than in FIGS. 1–8.
Figure 10:
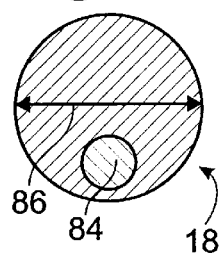
FIG. 10 is a cross-sectional view of the ball shown in FIG. 9, taken generally along line 10—10 in FIG. 9.

In the embodiment of counters 16 and 30 shown in FIGS. 1–8, a user may be operating with up to one-hundred balls 18 at a time. In a typical classroom environment, it is easy to tip or spill counters 16 or 30, or elevated tray 12, spilling balls 18. A special construction is preferred for balls 18 to limit the amount of scattering that would result from such a spilling. This special construction, shown in FIGS. 9 and 10, includes an eccentrically placed weight 84 that tends to limit the amount to which ball 18 will roll. For example, if ball 18 is made mostly from a light plastic, and weight 84 is a very dense plastic or metal, ball 18 typically will role only a few times before stopping in a stable position. For reference, a diameter 86 is indicated in FIG. 10. It should also be appreciated that ball 18 is just one example of what is referred to in the claims more broadly as a unit indicator, to describe any item that is easy to handle and move from counter 16 to tray 12, or from tray 12 to counter 36.

Figure 11:
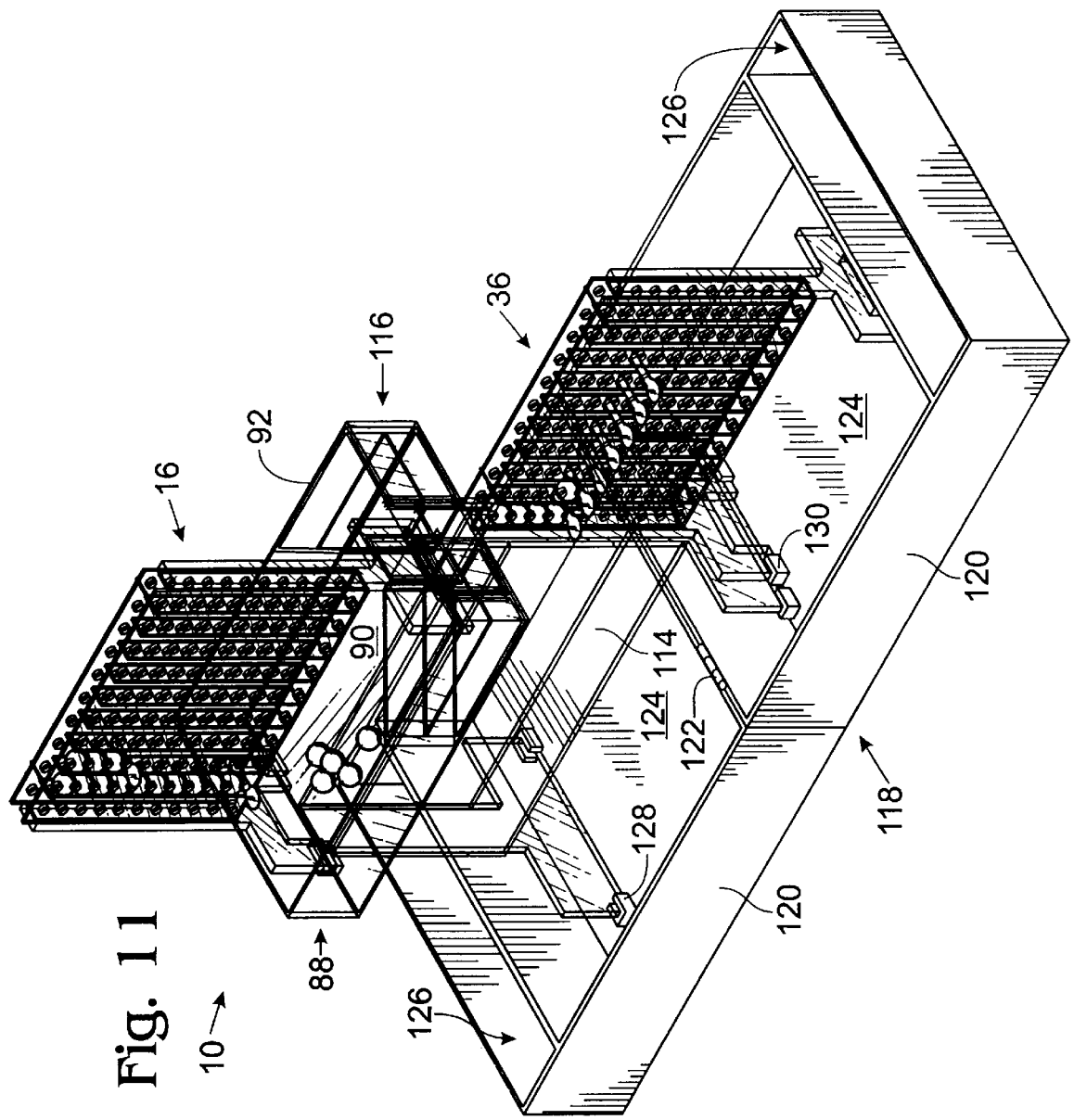
FIG. 11 is an isometric view of an alternative embodiment of the teaching device according to the present invention, taken from the upper, front, right corner, shown on a reduced scale than in FIG. 1, and shown being used to solve the problem twenty-three divided by four.

FIG. 11 shows an alternative embodiment of device 10. It includes the basic components discussed above, including counters, an elevated tray, unit indicators and a storage box. The elevated tray of this embodiment is indicated generally at 88, and includes a floor 90 and outer walls 92. Tray 88 is shown in detail in FIG. 12.

Figure 12:
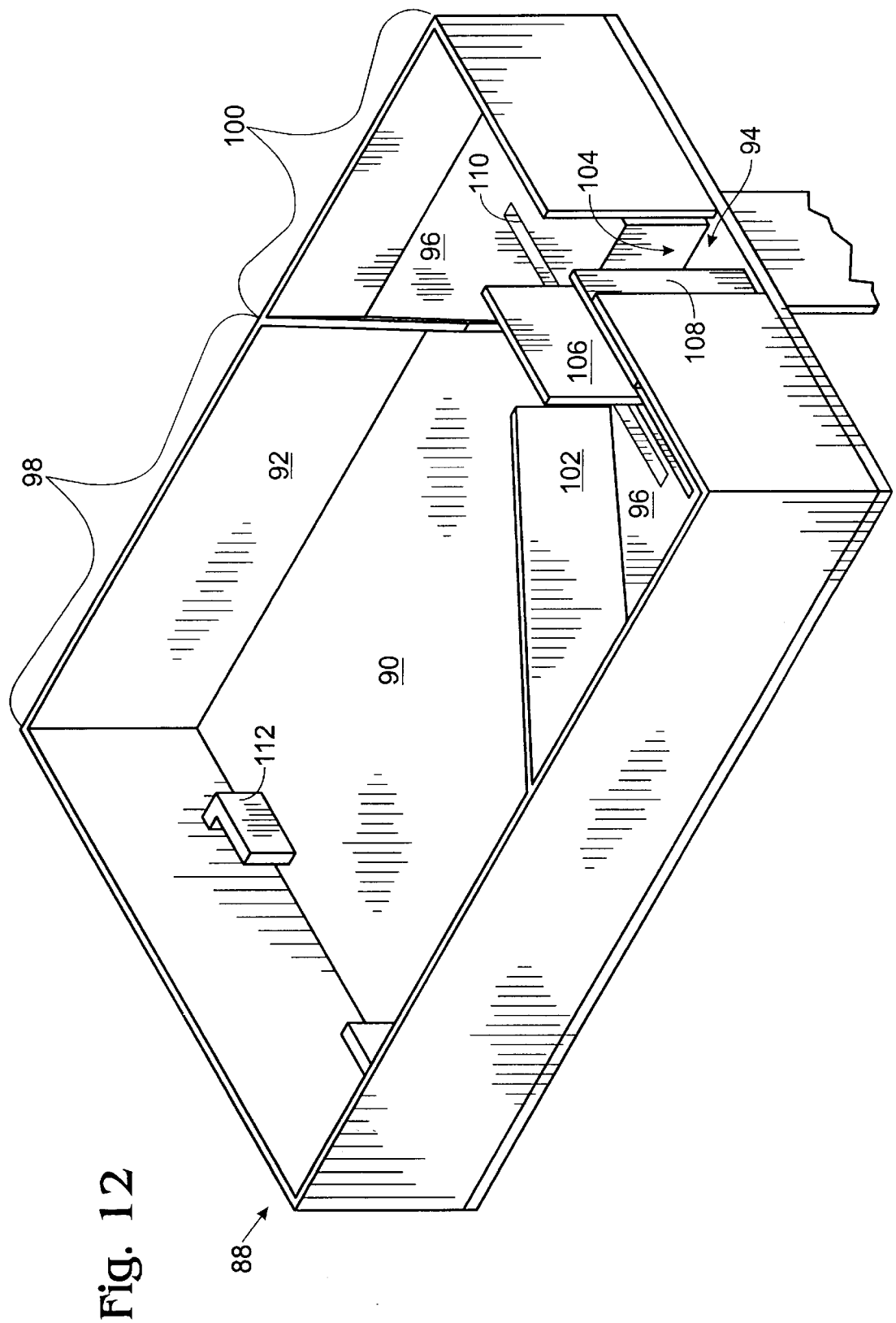
FIG. 12 is an isometric, fragmentary view of the tray portion of the alternative embodiment shown in FIG. 11, taken from the upper, front, right corner, shown on a substantially larger scale than in FIG. 11.

Referring to FIG. 12, showing an opaque embodiment of tray 88, an outlet 94 formed in walls 92 preferably is flanked by a pair of raised platforms 96, effectively dividing tray 88 into an open lower area 98 and an upper area 100. Raised platforms 96 are defined by guide walls 102 that rise above raised platforms 96, and a ball channel 104 formed between raised platforms 96. Guide walls 102 also form a funnel in lower area 98 that eases the directing of balls 18 from lower area 98 into channel 104 and ultimately out of outlet 94.

Upper area 100 provides a separate holding area within tray 88, so that balls 18 may be sorted or selectively separated by hand within tray 88, with some placed in lower area 98 and others placed in upper area 100. For example, an alternative approach to solving a subtraction problem would be to load counter 16 with the number of balls 18 from which a number of balls is to be subtracted, and then release all of balls 18 into lower area 98. Referring back to FIG. 11, it will be seen that lower area 90 is the portion of tray 84 into which counter 16 releases balls 18. The number of balls 18 to be subtracted may be removed from lower area 98, and placed on raised platforms 96. The solution to the problem is found by feeding the remaining balls 18 from lower area 98 to the output counter 36. Confirmation of the number subtracted may be obtained by aligning an empty counter 16 with outlet 94, and then forcing the removed balls 18 off of raised platforms 96, through outlet 94, and into the empty counter 16.

The type of sorting just described works particularly well with the eccentrically weighted balls described above, because the balls tend to stay in one place. It is made even easier by the use of a first sliding gate 106, slidably held in a groove formed in raised platforms 96 adjacent lower area 98, and a second sliding gate 108, formed in raised platforms 96 adjacent outlet 86. First gate 106, in combination with guide walls 102, walls off and separates upper area 100 from lower area 98, when first gate 106 is closed. This prevents any of the removed balls from falling from upper area 100 back into lower area 98. Gate 106 also holds balls 18 in lower area 98 and may be used for selectively allowing balls 18 to pass from tray 88 to output counter 36. Second gate 108 keeps the removed balls from inadvertently falling into output counter 36, and when used in combination with first gate 106 and channel 104, allows precise control of the number of balls 18 that cascade from tray 88 into output counter 36.

Lower area 98 is large enough to hold a full load of balls 18 from counter 16. By this, it is meant that, if counter 16 is loaded to maximum capacity, and then all of balls 18 are dumped into tray 88, all of balls 18 will be spread out into a single or double layer. Depending on the maximum capacity of counter 16, this may be more or less practical. Spreading out balls 18 is helpful if any sorting of balls 18 is to be done, such as manually removing those balls 18 that have been pre-identified with a different color, texture, or shape.

Tray 88 also may be formed with a counter receptacle 110 for holding counter 16 in a fixed position relative to tray 88. Receptacle 110 is basically a notch or groove formed in raised platforms 96, into which counter 16 is inserted, or against which it rests. A separate receptacle 112 may also be formed, as shown.

Returning to FIG. 11, tray 88 is elevated relative to output counter 36 by a pedestal 114, integrally formed with tray 88 to form a connector 116 serving the same purpose during operation as the connector (tray 12 and box 14) of the earlier-described embodiment. Pedestal 114 is sized relative to counter 36 so that balls 18 may be push-fed from tray 88 to counter 36 while connector 116 is on top of pedestal 114 and both pedestal 114 and counter 36 are resting on a single flat surface.

Connector 116 and counter 36 are shown standing on such a flat surface, in the form of an open storage case 118, which is a suitcase-style box formed from two halves 120 interconnected by a hinge 122. Each half 120 includes a basin region 124 and a storage compartment 126. Connector 116 may be placed in basin region 124 of one half 120, and output counter 36 is placed in basin region 124 of the other half 120, as shown in FIG. 11.

Basin regions 124 help contain balls 18, catching any balls 18 that are released from output counter 36, or dropped inadvertently. Basin regions 124 also provide an easily accessible holding area for any balls 18 not being used in solving a particular problem. Furthermore, basin regions 124 may include a connector receptacle 128 for holding connector 116 in an operable position at a fixed location relative to case 118, and a counter receptacle 130 for holding output counter 36 in an operable position at a fixed location relative to case 118. When connector 116 is held in connector receptacle 128 and output counter 36 is held in counter receptacle 130, connector 116 and counter 36 are fixed relative to each other to ensure smooth movement of balls 18 from connector 116 to counter 36.

When storing the alternative embodiment of device 10 shown in FIG. 11, counter 16 may be nested on one side of connector 116 and counter 36 may be nested on the other side of connector 116. This sandwiches pedestal 114 between counter 16 and counter 36, making a compact package for storage, requiring an overall volume of case 82 that is little larger than that required just to hold tray 12 by itself. The sandwiched counter 16, connector 116 and counter 36 are laid flat in basin region 124 of one of the halves 120, as are any panes 40 and 44 (not shown in FIG. 11). The other half 120 may then be folded closed about hinge 122, enclosing device 10 within storage case 118.

Modifications to the preferred and alternative embodiments may be made without departing from the scope of the present invention. These modifications are intended to be encompassed by the following claims.

Operation

The above-described device 10 may be used for teaching many different aspects of mathematics. Its use for teaching counting, multiplication, division, addition and subtraction are described below. Device 10 also is used readily to demonstrate math-related concepts such as patterns, fractions, different bases, graphing, statistics, and negative numbers. It is envisioned that once the student masters the use of device 10 for these types of problems, both student and teacher will experiment with device 10 to discover its uses for many other types of problems and activities.

Device 10 may be used for counting as follows. A ball 18 is placed in trough 62 and allowed or forced to roll and fall into a selected column 20. Ball 18 will fall until it hits a peg 24 inserted into column 20, or, if the column is partially filled, until ball 18 hits other balls 18 held in the column. If pegs 24 are inserted into a hole 22 at the bottom of each column 20 and balls 18 are controlled to fill completely a single column 20 before filling any of the next column 20, each filled column 20 represents a place in the particular base system being used. For base ten, each filled column would hold ten balls 18. Filled columns 20 would represent the number of tens and balls 18 in a partially filled column 20 represent the number of ones. Thus, two filled columns would represent the number twenty, and two filled columns with a third column filled with four marbles represent the number twenty-four.

Multiplication begins by placing a peg 24 into each column 20 at a predefined depth 38. Depth 38 represents the multiplicand, and the number of such columns 20 that are then filled with balls 18 represents the multiplier. For example, setting each column 20 to a depth 38 to hold six balls 18, and then filling five of those columns 20 with six balls 18 each demonstrates the problem of six times five. Many students may prefer to view this as five times six—such an approach is perfectly acceptable, and shows the flexibility in use of device 10.

The answer is obtained by placing counter 16 into tray 12 so that counter 16 is an input counter, and then removing all pegs 24 from counter 16. Balls 18 thus fall into tray 12, from where they can be forced into a second counter 36. Second counter 36 is set up to be used for counting, as discussed above, and the solution to the problem is seen easily by the student once balls 18 have been fed sequentially into counter 36.

Division is performed by reversing the steps of multiplication. A first counter 16 is used to count the desired number of balls 18 to represent the dividend. Counter 16 is placed on tray 12, and pegs 24 are removed to allow balls 18 to fall into tray 12. A second counter 36 with pegs 24 placed at a depth 38 to represent the divisor is used to show the answer. Balls 18 are fed from tray 12 sequentially to fill columns 20 in counter 36. The number of columns filled by balls 18 shows the quotient, and if a column is only partially filled when all of balls 18 have been fed from tray 12, the number of balls 18 in the partially filled column 20 represents the remainder.

Addition may be demonstrated by device 10 in several ways. One way is to split, visually or mentally, a first counter 16 into two virtual counters. For example, the pane shown in table format below, in Table 2, may be used.

TABLE 2

Input pane for addition

| 1  | 11 | 21 | 31 | 41 | 1  | 11 | 21 | 31 | 41 |
|----|----|----|----|----|----|----|----|----|----|
| 2  | 12 | 22 | 32 | 42 | 2  | 12 | 22 | 32 | 42 |
| 3  | 13 | 23 | 33 | 43 | 3  | 13 | 23 | 33 | 43 |
| 4  | 14 | 24 | 34 | 44 | 4  | 14 | 24 | 34 | 44 |
| 5  | 15 | 25 | 35 | 45 | 5  | 15 | 25 | 35 | 45 |
| 6  | 16 | 26 | 36 | 46 | 6  | 16 | 26 | 36 | 46 |
| 7  | 17 | 27 | 37 | 47 | 7  | 17 | 27 | 37 | 47 |
| 8  | 18 | 28 | 38 | 48 | 8  | 18 | 28 | 38 | 48 |
| 9  | 19 | 29 | 39 | 49 | 9  | 19 | 29 | 39 | 49 |
| 10 | 20 | 30 | 40 | 50 | 10 | 20 | 30 | 40 | 50 |

One of these virtual counters is used to count balls 18 to represent the first number to be added and the second of these virtual counters is used to count balls 18 to represent the second number to be added. Counter 16 then is placed in tray 12, and pegs 24 are removed to allow balls 18 to fall into tray 12. A second counter 36 is used for counting, as discussed above, to represent the answer or sum to the problem.

As an alternative to the visual or mental splitting of counter 16 into several counters, a single counter 16 may be used repeatedly, with each number to be added counted and then dumped into tray 12. Yet another approach is to count the first number to be added in first counter 16 and count the second number to be added in second counter 36. Pegs 24 then are removed from counter 16 so that balls 18 fall into tray 12. Pegs 24 in second counter 36 are rearranged without allowing any balls 18 to fall from counter 36 so that counter 36 may be used for the counting operation discussed above. When all balls 18 have been fed from tray 12 into counter 36, the sum again is indicated.

Subtraction may be demonstrated by using a first counter 16 to count balls 18 to represent the number from which a second number is to be subtracted. This second number then may be superimposed on the counted balls 18 by inserting a second set of pegs 24 into a filled or partially filled column 20 of counter 16. The balls 18 below this second set of pegs 24 would represent the number to be subtracted. Once the second set of pegs 24 is in place, all remaining pegs 24 may be removed, allowing the subtracted balls 18 to fall out, and learning the answer in counter 16. Alternatively, the balls 18 above this second set of pegs 24 would represent the number to be subtracted and all balls below or outside of this superimposed number would be allowed to fall into tray 12 by removing the remaining pegs 24. The subtracted balls 18 then could be fed into a second counter 36 to count the number of balls 18, thus showing the answer to the problem.

Given the above descriptions of the basic operations that may be performed using device 10, numerous variations on these operations and more complicated operations also may be performed. These operations may be visualized more easily through the use of panes 40 and 44, particularly those panes 44 having posts 70. Posts 70 allow rubber bands or other such objects to be placed over posts 70 to trace the shape or pattern to be produced. If pegs 24 are inserted into counter 16 within such a pattern, balls 18 may be fed into counter 16 so that only a portion of the traced pattern is filled. This may be particularly useful for presenting problems using negative numbers.

I claim:

1. A cascaded computational teaching device for the visual, tactile and aural presentation of mathematical problem-solving, the device comprising:

a plurality of unit indicators;

an input counter including a plurality of indicator-receiving input cavities and a plurality of movable stops for setting a maximum unit indicator volume for one or more of the input cavities;

an output counter disposed beneath the input counter, the output counter including a plurality of indicator-receiving output cavities and a plurality of movable stops for setting a maximum unit indicator volume for one or more of the output cavities; and a connector placed between the input counter and the output counter for receiving unit indicators from the input counter, and directing the unit indicators into the output counter.

2. The teaching device according to claim 1, wherein the input cavities are parallel columns each having a longitudinal axis.

3. The teaching device according to claim 2, wherein the longitudinal axes of the columns are coplanar.

4. The teaching device according to claim 2, wherein the longitudinal axes of the columns are approximately vertical.

5. The teaching device according to claim 1, wherein the output cavities are parallel columns each having a longitudinal axis.

6. The teaching device according to claim 5, wherein the longitudinal axes of the columns are coplanar.

7. The teaching device according to claim 5, wherein the longitudinal axes of the columns are approximately vertical.

8. The teaching device according to claim 1, further comprising a first removable labeled pane operatively attached to the input counter to indicate visually the purpose of one or more of the cavities for a particular type of mathematical problem.

9. The teaching device according to claim 1, further comprising a first removable labeled pane operatively attached to the output counter to indicate visually the solution to the mathematical problem once the unit indicators are fed into the output counter from the connector.

10. The teaching device according to claim 1, in which a unit-indicator retaining trough interconnecting the output cavities is formed having walls that extend above an opening of each of the output cavities so that the openings are between the walls of the trough.

11. The teaching device according to claim 1, wherein the input counter rests on and is supported by the connector.

12. The teaching device according to claim 1, wherein the connector includes a pedestal for elevating the connector relative to the output counter, and the input counter and the output counter nest with the pedestal to define an overall volume of approximately the same volume as the connector and pedestal combination.

13. The teaching device according to claim 12, further comprising a carrying case for receiving and protecting the nested counters and connector, wherein the carrying case includes a connector receptacle for holding the connector in an operable position at a fixed location relative to the case, and the case includes a counter receptacle for holding the output counter in an operable position at a fixed location relative to the case and the connector when the connector is held in the connector receptacle.

14. The teaching device according to claim 1, wherein the connector includes a tray with an open area large enough to allow the unit indicators to be distributed in a single layer.

15. The teaching device according to claim 14, wherein the open area is divided into a lower area and an upper area so that the unit indicators may be selectively separated by hand, with some placed in the lower area and others placed in the upper area.

16. The teaching device according to claim 15, wherein the connector includes a gate for separating the upper and lower areas of the tray.

17. The teaching device according to claim 14, wherein the connector includes a gate for holding the unit indicators in the open area and for selectively allowing the unit indicators to pass from the connector to the output counter.

18. A computational teaching device comprising:
   a plurality of unit indicators of a fixed size;
   a first set of unit indicator-receiving columns, each column having an open top and an open bottom;
   a plurality of movable pegs, with one or more of the pegs inserted into one or more columns in the first set to define a depth for those columns, thereby establishing a set quantity of unit indicators that can be received by those columns;
   a tray disposed beneath the bottoms of the first set of columns to receive the unit indicators, the tray having an outlet for the unit indicators to exit the tray; and
   a second set of unit indicator-receiving columns, each column having an open top operatively connected to and sequentially aligned with the outlet of the tray so that unit indicators from the tray can be directed into the second set of columns in sequence.

19. The teaching device according to claim 18, wherein one or more of the pegs is inserted into one or more columns in the second set to define a depth for those columns of the second set, thereby establishing a set quantity of unit indicators that can be received by those columns.

20. A teaching device comprising:
   a group of balls;
   a first counter to represent the problem to be solved, the first counter including several parallel columns for holding several of the balls in a line, and a stop for at least one of the columns to limit the number of balls that can be held by that column;
   a second counter to indicate the solution to the problem, the counter including several parallel columns for holding several of the balls in a line, and a stop for at least one of the columns to limit the number of balls that can be held by that column; and
   an elevated tray placed below the first counter so that balls placed in the first counter may be dumped into the tray by removing the stop from the column of the first counter, and then pushed or allowed to fall from the tray into the second counter.

21. A computational teaching device for the visual, tactile and aural presentation of mathematical problem-solving, the device comprising:
   a plurality of unit indicator means for indicating units in a mathematical problem;
   an upper counter means for holding the unit indicator means in a user-definable geometry;
   a connector means disposed below the upper counter means for receiving the unit indicator means from the upper counter means; and
   a lower counter means disposed adjacent the connector means for placing the unit indicator means into a user-definable geometry, thereby indicating a solution to the problem.

22. A cascaded computational teaching device for the visual, tactile and aural presentation of mathematical problem-solving, the device comprising:
   a plurality of unit indicators;
   at least one counter including a plurality of indicator-receiving cavities and a plurality of movable stops for setting a maximum unit indicator volume for one or more of the cavities;
   a connector for receiving unit indicators from a counter, and then directing the unit indicators into a counter; and
   a pedestal for elevating and supporting the connector;
   wherein:
      the connector is sized relative to the counter so that unit indicators may be moved simultaneously from the counter to the connector; and
      the pedestal is sized relative to the counter so that the unit indicators may be push-fed from the connector to the counter while the connector is on top of the pedestal and both the pedestal and the counter are resting on a single flat surface.

23. The teaching device according to claim 22, wherein the pedestal and the connector are an integral unit.

24. The teaching device according to claim 22, wherein the pedestal is a hollow box, and the connector is an inverted lid for the box.

25. The teaching device according to claim 22, wherein the cavities are parallel columns each having a longitudinal axis.

26. The teaching device according to claim 22, wherein the longitudinal axes of the columns are coplanar.

27. The teaching device according to claim 22, further comprising a first removable labeled pane operatively attached to the counter to indicate visually the purpose of one or more of the cavities for a particular type of mathematical problem.

28. The teaching device according to claim 22, in which a unit-indicator retaining trough interconnecting the cavities is formed having walls that extend above an opening of each of the cavities so that the openings are between the walls of the trough.

29. A counter for use in a cascaded computational teaching device for the visual, tactile and aural presentation of mathematical problem-solving, the counter comprising:

a plurality of indicator-receiving cavities;

a plurality of movable stops for setting a maximum unit indicator volume for one or more of the cavities;

at least one pin extending outwardly from the counter adjacent the indicator-receiving cavities, the pin having an end exposed for receiving a pane;

a removable pane operatively attached to the counter adjacent the indicator-receiving cavities by being slid onto the pin, the pane being at least partially clear to allow visual monitoring of at least one of the cavities and labeled to indicate visually the purpose of one or more of the cavities for a particular type of mathematical problem.

30. A cascaded computational teaching device for the visual, tactile and aural presentation of mathematical problem-solving, the device comprising:

a plurality of unit indicators;

at least one counter including a plurality of indicator-receiving cavities and a plurality of movable stops for setting a maximum unit indicator volume for one or more of the cavities; and a hollow box for storing the counter;

a reversible lid placed on the box;

wherein:

the counter may be placed inside the box in a stored position;

the lid is formed with walls that extend downwardly to conform to the box so that the lid may be held on the box and thereby enclose the box;

the lid is reversible relative to the box so that the walls may extend upwardly from the box to define the outer limits of a connector for receiving unit indicators from a counter;

the lid is sized relative to the counter so that unit indicators may be moved simultaneously from the counter to the lid;

the walls of the lid include an outlet through which the unit indicators may be fed into a counter; and the lid and box are sized relative to the counter so that the unit indicators may be push-fed into the counter when both the box and the counter are placed on a flat surface, the lid is placed on the box in the inverted position and the counter is aligned with the outlet of the walls of the lid.

31. A cascaded computational teaching device for the visual, tactile and aural presentation of mathematical problem-solving, the device comprising:

a plurality of unit indicators;

an input counter including a plurality of indicator-receiving input cavities and a plurality of movable stops for setting a maximum unit indicator volume for one or more of the input cavities;

an output counter disposed beneath the input counter, the output counter including a plurality of indicator-receiving output cavities and a plurality of movable stops for setting a maximum unit indicator volume for one or more of the output cavities;

a connector placed between the input counter and the output counter for receiving unit indicators from the input counter, and directing the unit indicators into the output counter, wherein the connector includes a pedestal for elevating the connector relative to the output counter, and the input counter and the output counter nest with the pedestal to define an overall volume of approximately the same volume as the connector and pedestal combination; and a carrying case for receiving and protecting the nested counters and connector, wherein the carrying case includes a connector receptacle for holding the connector in an operable position at a fixed location relative to the case, and the case includes a counter receptacle for holding the output counter in an operable position at a fixed location relative to the case and the connector when the connector is held in the connector receptacle.

32. A cascaded computational teaching device for the visual, tactile and aural presentation of mathematical problem-solving, the device comprising:

a plurality of unit indicators;

a counter including a plurality of indicator-receiving cavities; and a plurality of separately movable stops for setting a maximum unit indicator volume for one or more of the input cavities.

* * * * *